United States Patent
Krishnan

(10) Patent No.: US 10,621,616 B2
(45) Date of Patent: Apr. 14, 2020

(54) SYSTEMS, METHODS, AND DEVICES FOR GENERATING METRICS ASSOCIATED WITH ADVERTISEMENT DATA OBJECTS

(71) Applicant: Amboee, Inc., Redwood City, CA (US)

(72) Inventor: Harshini Ramnath Krishnan, Redwood City, CA (US)

(73) Assignee: Amobee, Inc., Redwood City, CA (US)

(*) Notice: Subject to any disclaimer, the term of this patent is extended or adjusted under 35 U.S.C. 154(b) by 1025 days.

(21) Appl. No.: 14/877,530

(22) Filed: Oct. 7, 2015

(65) Prior Publication Data

US 2017/0103416 A1 Apr. 13, 2017

(51) Int. Cl.
*G06Q 30/02* (2012.01)

(52) U.S. Cl.
CPC ..... *G06Q 30/0254* (2013.01); *G06Q 30/0277* (2013.01)

(58) Field of Classification Search
CPC .................. G06Q 30/0254; G06Q 30/0277
USPC ........... 705/14.52, 14.12, 14.5, 14.45, 14.54; 715/751; 707/754
See application file for complete search history.

(56) References Cited

U.S. PATENT DOCUMENTS

| | | | |
|---|---|---|---|
| 2006/0155597 A1* | 7/2006 | Gleason | G06Q 30/02 705/14.12 |
| 2010/0125492 A1* | 5/2010 | Lin | G06Q 20/3274 705/14.5 |
| 2011/0055005 A1* | 3/2011 | Lang | G06Q 30/02 705/14.45 |
| 2011/0138301 A1* | 6/2011 | Hirako | G06F 16/44 715/751 |
| 2011/0295689 A1* | 12/2011 | Brady | G06Q 30/0241 705/14.54 |
| 2013/0151539 A1* | 6/2013 | Shi | G06F 16/9535 707/754 |
| 2016/0260121 A1* | 9/2016 | Wood | G06Q 30/0243 |
| 2017/0103416 A1* | 4/2017 | Krishnan | G06Q 30/0277 |

FOREIGN PATENT DOCUMENTS

WO WO-2004090753 A1 * 10/2004 ............. G06F 16/10

OTHER PUBLICATIONS

AdExchanger, Which is the Better Metric for Digital Advertisers, 2015 (Year: 2015).*

(Continued)

*Primary Examiner* — Tarek Elchanti
(74) *Attorney, Agent, or Firm* — Kwan & Olynick LLP

(57) ABSTRACT

Disclosed herein are systems, methods, and devices for generating efficacy metrics. Systems may include a data object aggregator configured to receive a plurality of advertisement data objects characterizing online advertising content associated with at least one online advertisement campaign. Systems may also include an efficacy metric generator configured to generate a plurality of efficacy metrics characterizing an estimate of a probability of at least some of the plurality of advertisement data objects interacting with a target audience, where the generating is based on one or more properties of the plurality of advertisement data objects. Systems may further include a report generator configured to generate at least one report based on the plurality of efficacy metrics.

19 Claims, 8 Drawing Sheets

(56) References Cited

OTHER PUBLICATIONS

"Analyzing Persuasive Techniques in Advertising", Lesson 15, Academic Vocabulary, McDougal Littell/Houghton Mifflin Co., Retrieved from the Internet: <http://www.classzone.com/cz/books/ml_lit_gr12/resources/pdfs/media_analysis/HS_15_Ad_Techniques2.pdf>, Accessed on Oct. 7, 2015, 4 pgs.

Lewinski, Peter et al., "Predicting Advertising Effectiveness by Facial Expressions", Journal of Neuroscience, Psychology, and Economics, 10.1037, 2014, Retrieved from the Internet: <http://dare.uva.nl/document/522510>, Accessed on Oct. 7, 2015, 32 pgs.

* cited by examiner

SYSTEMS, METHODS, AND DEVICES FOR GENERATING METRICS ASSOCIATED WITH ADVERTISEMENT DATA OBJECTS

TECHNICAL FIELD

This disclosure generally relates to online advertising, and more specifically to analyzing advertisement data objects associated with online advertising.

BACKGROUND

In online advertising, internet users are presented with advertisements as they browse the internet using a web browser or mobile application. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are purchased on a daily basis through public auctions hosted by real time bidding (RTB) exchanges. In many instances, a decision by an advertiser regarding whether to submit a bid for a selected RTB ad request is made in milliseconds. Advertisers often try to buy a set of ad impressions to reach as many targeted users as possible. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

SUMMARY

Disclosed herein are systems, methods, and devices for generating and analyzing advertisement data objects. Systems as disclosed herein may include a data object aggregator configured to receive a plurality of advertisement data objects characterizing online advertising content associated with at least one online advertisement campaign. Systems may also include an efficacy metric generator configured to generate a plurality of efficacy metrics characterizing an estimate of a probability of at least some of the plurality of advertisement data objects interacting with a target audience, where the generating is based on one or more properties of the plurality of advertisement data objects. Systems may further include a report generator configured to generate at least one report based on the plurality of efficacy metrics.

In various embodiments, the plurality of efficacy metrics is generated based on a comparison of a first set of targeting criteria obtained from the plurality of advertisement data objects and a second set of targeting criteria obtained from the at least one online advertisement campaign. In some embodiments, the first set of targeting criteria are obtained based on textual, visual, and audio data included in the plurality of advertisement data objects. According to some embodiments, the plurality of efficacy metrics is generated based on past performance data associated with the at least one online advertisement campaign. In various embodiments, the generating of the plurality of efficacy metrics is generated based on a weighted combination of first efficacy scores associated with the comparison of the first set of targeting criteria and the second set of targeting criteria, and second efficacy scores associated with the past performance data.

In some embodiments, the at least one report includes a summary of at least some of the plurality of efficacy metrics, and the at least one report further includes a plurality of recommendations associated with the plurality of advertisement data objects. In various embodiments, the plurality of recommendations characterizes modifications associated with the plurality of advertisement data objects, where the modifications are capable of increasing at least some of the plurality of efficacy metrics. In some embodiments, the efficacy metric generator is configured to generate a plurality of updated efficacy metrics in response to receiving an input from an advertiser. According to some embodiments, the updated efficacy metrics are generated based on one or more modifications identified by the input, where the one or more modifications are based, at least in part on the plurality of recommendations. In various embodiments, the at least one report is generated responsive to a request received from an advertiser. In some embodiments, the plurality of advertisement data objects is received via a batch upload.

Also disclosed herein are devices that may include a first processing node configured to receive a plurality of advertisement data objects characterizing online advertising content associated with at least one online advertisement campaign. The devices may also include a second processing node configured to generate a plurality of efficacy metrics characterizing an estimate of a probability of at least some of the plurality of advertisement data objects interacting with a target audience, where the generating is based on one or more properties of the plurality of advertisement data objects. The devices may further include a third processing node configured to generate at least one report based on the plurality of efficacy metrics.

In some embodiments, the plurality of efficacy metrics is generated based on a comparison of a first set of targeting criteria obtained from the plurality of advertisement data objects and a second set of targeting criteria obtained from the at least one online advertisement campaign. In various embodiments, the plurality of efficacy metrics is generated based on past performance data associated with the at least one online advertisement campaign. In some embodiments, the generating of the plurality of efficacy metrics is generated based on a weighted combination of first efficacy scores associated with a comparison of the first set of targeting criteria and the second set of targeting criteria, and second efficacy scores associated with the past performance data. According to some embodiments, the at least one report includes a summary of at least some of the plurality of efficacy metrics, and the at least one report further includes a plurality of recommendations associated with the plurality of advertisement data objects.

Further disclosed herein are one or more non-transitory computer readable media having instructions stored thereon for performing a method, where the method includes receiving a plurality of advertisement data objects characterizing online advertising content associated with at least one online advertisement campaign. The methods may also include generating a plurality of efficacy metrics characterizing an estimate of a probability of at least some of the plurality of advertisement data objects interacting with a target audience, the generating being based on one or more properties of the plurality of advertisement data objects. The methods may further include generating at least one report based on the plurality of efficacy metrics, the at least one report characterizing efficacy metrics associated with at least some of the plurality of advertisement data objects.

In some embodiments, the generating of the plurality of efficacy metrics includes comparing a first set of targeting criteria obtained from the plurality of advertisement data objects with a second set of targeting criteria obtained from the at least one online advertisement campaign. In various embodiments, the generating of the plurality of efficacy metrics includes comparing the advertisement data objects with past performance data associated with the at least one online advertisement campaign. According to some embodiments, the generating of the plurality of efficacy metrics includes combining first efficacy scores associated with the comparison of the first set of targeting criteria and the second set of targeting criteria, and second efficacy scores associated with the past performance data.

Details of one or more embodiments of the subject matter described in this specification are set forth in the accompanying drawings and the description below. Other features, aspects, and advantages will become apparent from the description, the drawings, and the claims.

DETAILED DESCRIPTION

Figure 1:
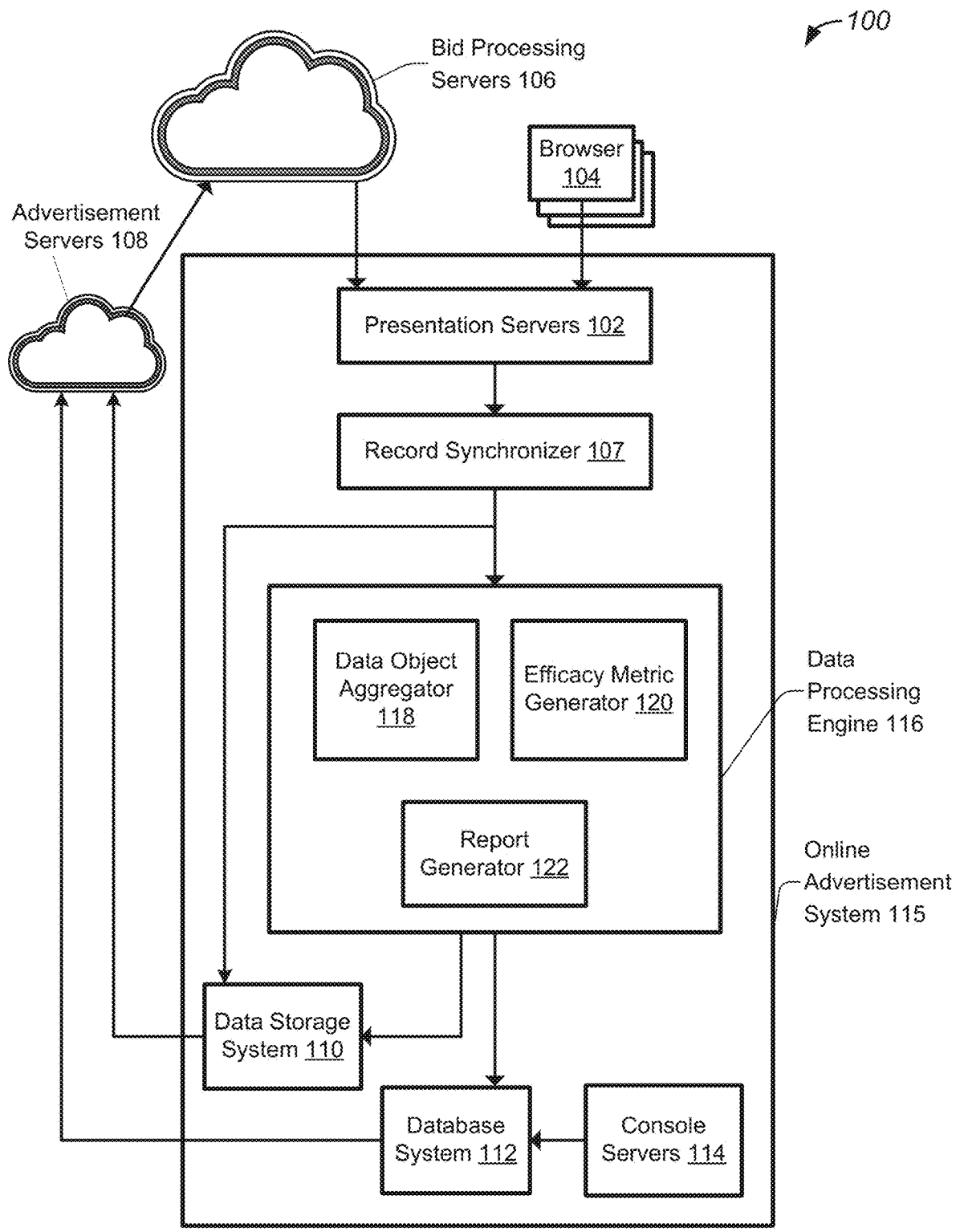
FIG. 1 illustrates a diagram of an example of a system for generating efficacy metrics, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

In online advertising, advertisers often try to provide the best ad for a given user in an online context. Advertisers often set constraints which affect the applicability of the advertisements. For example, an advertiser might try to target only users in a particular geographical area or region who may be visiting web pages of particular types for a specific campaign. Thus, an advertiser may try to configure a campaign to target a particular group of end users, which may be referred to herein as an audience. As used herein, a campaign may be an advertisement strategy which may be implemented across one or more channels of communication. Furthermore, the objective of advertisers may be to receive as many user actions as possible by utilizing different campaigns in parallel. As previously discussed, an action may be the purchase of a product, filling out of a form, signing up for e-mails, and/or some other type of action. In some embodiments, actions or user actions may be advertiser-defined and may include an affirmative act performed by a user, such as inquiring about or purchasing a product and/or visiting a certain page.

As will be discussed in greater detail below, to implement online advertisement campaigns, advertisers may provide advertisement data objects which may include advertisement content capable of being provided to users during the implementation of advertisement campaigns. For example, advertisement data objects may include advertisements capable of being displayed in a webpage, such as banner ads. Moreover, such advertisement data objects may be capable of receiving an input, such as a mouse click, from a user, thus enabling the performance of an action that may be referred to herein as a conversion. As will be discussed in greater detail below, it is preferable to have an advertisement be targeted to the particular target audience of the online advertisement campaign that includes the advertisement. When targeted in this way, an advertisement may have a high likelihood of generating a conversion when interacting with a user.

Traditional techniques for implementing advertisement data objects are not able to effectively or efficiently forecast or predict an effectiveness of advertisements prior to implementation in an advertisement campaign. While an advertiser may attempt to speculate how effective an advertisement may be, such speculations may simply involve guesswork and often require the actual implementation of the advertisement and subsequent analysis of its performance. Moreover, such speculation may be performed by a person. When performed in this way, traditional techniques are not able to handle large numbers of advertisements which may be generated for advertisement campaigns, which may number in the thousands to hundreds of thousands. Thus, traditional techniques are not able to forecast or predict an effectiveness of advertisements in a way that provides real-time feedback and forecasting to an advertiser.

Accordingly, various systems, methods, and devices disclosed herein provide the analysis of advertisement data objects and the generation of efficacy metrics associated with the advertisement data objects. As will be discussed in greater detail below, various embodiments disclosed herein may be configured to assess an efficacy of advertisement data objects that may be implemented in an online advertisement campaign. In various embodiments, efficacy metrics may be generated based on characteristics of the advertisement data objects themselves, as well as characteristics of the advertisement campaigns in which they are implemented. Accordingly, efficacy metrics may be generated for thousands of advertisement data objects at a time, thus enabling the rapid generation an efficacy measure across numerous advertisement data objects and numerous advertisement campaigns. In some embodiments, such rapid generation of efficacy metrics enables forecasting of the overall effectiveness of the advertisement data objects before they are actually implemented in an advertisement campaign.

FIG. 1 illustrates a diagram of an example of a system for generating efficacy metrics, configured in accordance with some embodiments. In various embodiments, system 100 may include online advertisement system 115 which may be used by an online advertisement service provider to provide advertisement services to one or more entities, such as advertisers. Online advertisement system 115 may include various components discussed in greater detail below. For example, online advertisement system 115 may include one or more presentation servers, such as presentation servers 102. According to some embodiments, presentation servers 102 may be configured to aggregate various online advertising data from several data sources. The online advertising data may include live internet data traffic that may be associated with users, as well as variety of supporting tasks. For example, the online advertising data may include one or more data values identifying various impressions, clicks, data collection events, and/or beacon fires that may characterize interactions between users and one or more advertisement campaigns. As discussed herein, such data may also be described as performance data that may form the underlying basis of analyzing a performance of one or more advertisement campaigns. In some embodiments, presentation servers 102 may be front-end servers that may be configured to process a large number of real-Internet users and associated SSL (Secure Socket Layer) handling. The front-end servers may be configured to generate and receive messages to communicate with other servers in system 100. In some embodiments, the front-end servers may be configured to perform logging of events that are periodically collected and sent to additional components of system 100 for further processing.

As similarly discussed above, presentation servers 102 may be communicatively coupled to one or more data sources such as browser 104 and bid processing servers 106. In some embodiments, browser 104 may be an Internet browser that may be running on a client machine associated with a user. Thus, a user may use browser 104 to access the Internet and receive advertisement content via browser 104. Accordingly, various clicks and other actions may be performed by the user via browser 104. Moreover, browser 104 may be configured to generate various online advertising data described above. For example, various cookies, advertisement identifiers, beacon fires, and anonymous user identifiers may be identified by browser 104 based on one or more user actions, and may be transmitted to presentation servers 102 for further processing. While browser 104 has been described above, any suitable publisher may be used, as will be discussed in greater detail below with reference to FIG. 3. As previously discussed, various additional data sources may also be communicatively coupled with presentation servers 102 and may also be configured to transmit similar identifiers and online advertising data based on the implementation of one or more advertisement campaigns by various advertisement servers, such as advertisement servers 108 discussed in greater detail below. For example, the additional data servers may include bid processing servers 106, which may process bid requests and generate one or more data events associated with providing online advertisement content based on the bid requests. Thus, bid processing servers 106 may be configured to generate data events characterizing the processing of bid requests and implementation of an advertisement campaign. Such bid requests may be transmitted to presentation servers 102.

In various embodiments, online advertisement system 115 may further include record synchronizer 107 which may be configured to receive one or more records from various data sources that characterize the user actions and data events described above. In some embodiments, the records may be log files that include one or more data values characterizing the substance of the user action or data event, such as a click or conversion. The data values may also characterize metadata associated with the user action or data event, such as a timestamp identifying when the user action or data event took place. According to various embodiments, record synchronizer 107 may be further configured to transfer the received records, which may be log files, from various end points, such as presentation servers 102, browser 104, and bid processing servers 106 described above, to a data storage system, such as data storage system 110 or database system 112 described in greater detail below. Accordingly, record synchronizer 107 may be configured to handle the transfer of log files from various end points located at different locations throughout the world to data storage system 110 as well as other components of system 100, such as data processing engine 116 discussed in greater detail below. In some embodiments, record synchronizer 107 may be configured and implemented as a MapReduce system that is configured to implement a MapReduce job to directly communicate with a communications port of each respective endpoint and periodically download new log files.

As discussed above, system 100 may further include advertisement servers 108 which may be configured to implement one or more advertisement operations. For example, advertisement servers 108 may be configured to store budget data associated with one or more advertisement campaigns, and may be further configured to implement the one or more advertisement campaigns over a designated period of time. In some embodiments, the implementation of the advertisement campaign may include identifying actions or communications channels associated with users targeted by advertisement campaigns, placing bids for impression opportunities, and serving content upon winning a bid. In some embodiments, the content may be advertisement content, such as an Internet advertisement banner, which may be associated with a particular advertisement campaign. The terms "advertisement server" and "advertiser" are used herein generally to describe systems that may include a diverse and complex arrangement of systems and servers that work together to display an advertisement to a user's device. For instance, this system will generally include a plurality of servers and processing nodes for performing different tasks, such as bid management, bid exchange, advertisement and campaign creation, content publication, etc. Accordingly, advertisement servers 108 may be configured to generate one or more bid requests based on various advertisement campaign criteria. As discussed above, such bid requests may be transmitted to bid processing servers 106.

In various embodiments, online advertisement system 115 may include data processing engine 116 which may be configured to receive advertisement data objects, generate efficacy scores and metrics based on the advertisement data objects, and generate reports that summarize the generated scores and metrics, provide recommendations, and enable modification of the advertisement data objects. Accordingly, data processing engine 116 may include data object aggregator 118 which may be configured to receive numerous advertisement data objects. As will be discussed in greater detail below, advertisement data objects may characterize online advertising content associated with at least one online advertisement campaign. Accordingly, the advertisement data objects may be capable of being implemented in an advertisement campaign and served to users who may then view the advertisement data objects and interact with them. The advertisement data objects may be uploaded by and entity, such as an advertiser, via an interface which may be provided by console servers 114. In some embodiments, the advertisement data objects may be retrieved from data storage system 110 or database system 112. Thus, data object aggregator 118 may be configured to receive the advertisement data objects and provide them to efficacy metric generator 120.

In various embodiments, data processing engine 116 may further include efficacy metric generator 120 which may be configured to generate efficacy scores and metrics based on the received advertisement data objects. As will be discussed in greater detail below, the efficacy metrics may characterize a probability of at least some of the plurality of advertisement data objects engaging a target audience. Accordingly, the efficacy metrics may provide a predictive measure of how effective a particular advertisement may be at interacting with a user included in a target audience, and generating a conversion based on the interaction. In various embodiments, efficacy metric generator 120 may be configured to analyze various properties of the advertisement data objects which may include text, persuasive techniques, facial expressions, character identities, color schemes, and various other features. Such efficacy metrics may be generated across numerous advertisement data objects that may be implemented in numerous different advertisement campaigns. In this way, efficacy metric generator 120 may handle the generation of efficacy metrics for thousands of advertisements and provide forecasts for each of the advertisements.

Data processing engine 116 may also include report generator 122 which may be configured to generate report based on the efficacy metrics. As will be discussed in greater detail below, reports may characterize the efficacy metrics associated with the advertisement data objects, thus providing an entity, such as an advertiser, with a summary of the efficacy metrics that that have been generated. Moreover, as will be discussed in greater detail below, the report may also provide recommendations detailing how the advertisement data objects may be modified to increase their efficacy scores, and may provide a user interface or console capable of making such modifications.

In various embodiments, data processing engine 116 or any of its respective components may include one or more processing devices configured to process performance data received from various data sources, such as a data storage system operated and maintained by an online advertisement service provider, such as Turn® Inc., Redwood City, Calif. In some embodiments, data processing engine 116 may include one or more communications interfaces configured to communicatively couple data processing engine 116 to other components and entities, such as a data storage system and a record synchronizer. Furthermore, as similarly stated above, data processing engine 116 may include one or more processing devices specifically configured to process data associated with data events, online users, and websites. In one example, data processing engine 116 may include several processing nodes, specifically configured to handle processing operations on large data sets. For example, data processing engine 116 may include a first processing node configured as data object aggregator 118, a second processing node configured as efficacy metric generator 120, and a third processing node configured as report generator 122. In another example, efficacy metric generator 120 may include data processing nodes for processing large amounts of data in a distributed manner. In one specific embodiment, data processing engine 116 may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. According to various embodiments, data processing engine 116 may be implemented as a controller, which may be a hardware controller. Moreover, data processing engine 116 may be configured to include one or more dedicated processing units that include one or more hardware accelerators configured to perform pipelined data processing operations. For example, as discussed in greater detail below, operations associated with the generation of efficacy metrics may be handled, at least in part, by one or more hardware accelerators included in efficacy metric generator 120, respectively.

In various embodiments, such large data processing contexts may involve performance data stored across multiple servers implementing one or more redundancy mechanisms configured to provide fault tolerance for the performance data. In some embodiments, a MapReduce-based framework or model may be implemented to analyze and process the large data sets disclosed herein. Furthermore, various embodiments disclosed herein may also utilize other frameworks, such as .NET or grid computing.

In various embodiments, online advertisement system 115 may include data storage system 110. In some embodiments, data storage system 110 may be implemented as a distributed file system. As similarly discussed above, in the context of processing online advertising data from the above described data sources, there may be many terabytes of log files generated every day. Accordingly, data storage system 110 may be implemented as a distributed file system configured to process such large amounts of data. In one example, data storage system 110 may be implemented as a Hadoop® Distributed File System (HDFS) that includes several Hadoop® clusters specifically configured for processing and computation of the received log files. For example, data storage system 110 may include two Hadoop® clusters where a first cluster is a primary cluster including one primary namenode, one standby namenode, one secondary namenode, one Jobtracker, and one standby Jobtracker. The second node may be utilized for recovery, backup, and time-costing query. Furthermore, data storage system 110 may be implemented in one or more data centers utilizing any suitable multiple redundancy and failover techniques.

In various embodiments, online advertisement system 115 may also include database system 112 which may be configured to store data generated by data processing engine 116. In some embodiments, database system 112 may be implemented as one or more clusters having one or more nodes. For example, database system 112 may be implemented as a four-node RAC (Real Application Cluster). Two nodes may be configured to process system metadata, and two nodes may be configured to process various online advertisement data, which may be performance data, that may be utilized by data processing engine 116. In various embodiments, database system 112 may be implemented as a scalable database system which may be scaled up to accommodate the large quantities of online advertising data handled by system 100. Additional instances may be generated and added to database system 112 by making configuration changes, but no additional code changes.

In various embodiments, database system 112 may be communicatively coupled to console servers 114 which may be configured to execute one or more front-end applications.

For example, console servers 114 may be configured to provide application program interface (API) based configuration of advertisements and various other advertisement campaign data objects. Accordingly, an advertiser may interact with and modify one or more advertisement campaign data objects via the console servers. In this way, specific configurations of advertisement campaigns may be received via console servers 114, stored in database system 112, and accessed by advertisement servers 108 which may also be communicatively coupled to database system 112. Moreover, console servers 114 may be configured to receive requests for analyses of performance data, and may be further configured to generate one or more messages that transmit such requests to other components of system 100.

Figure 2:
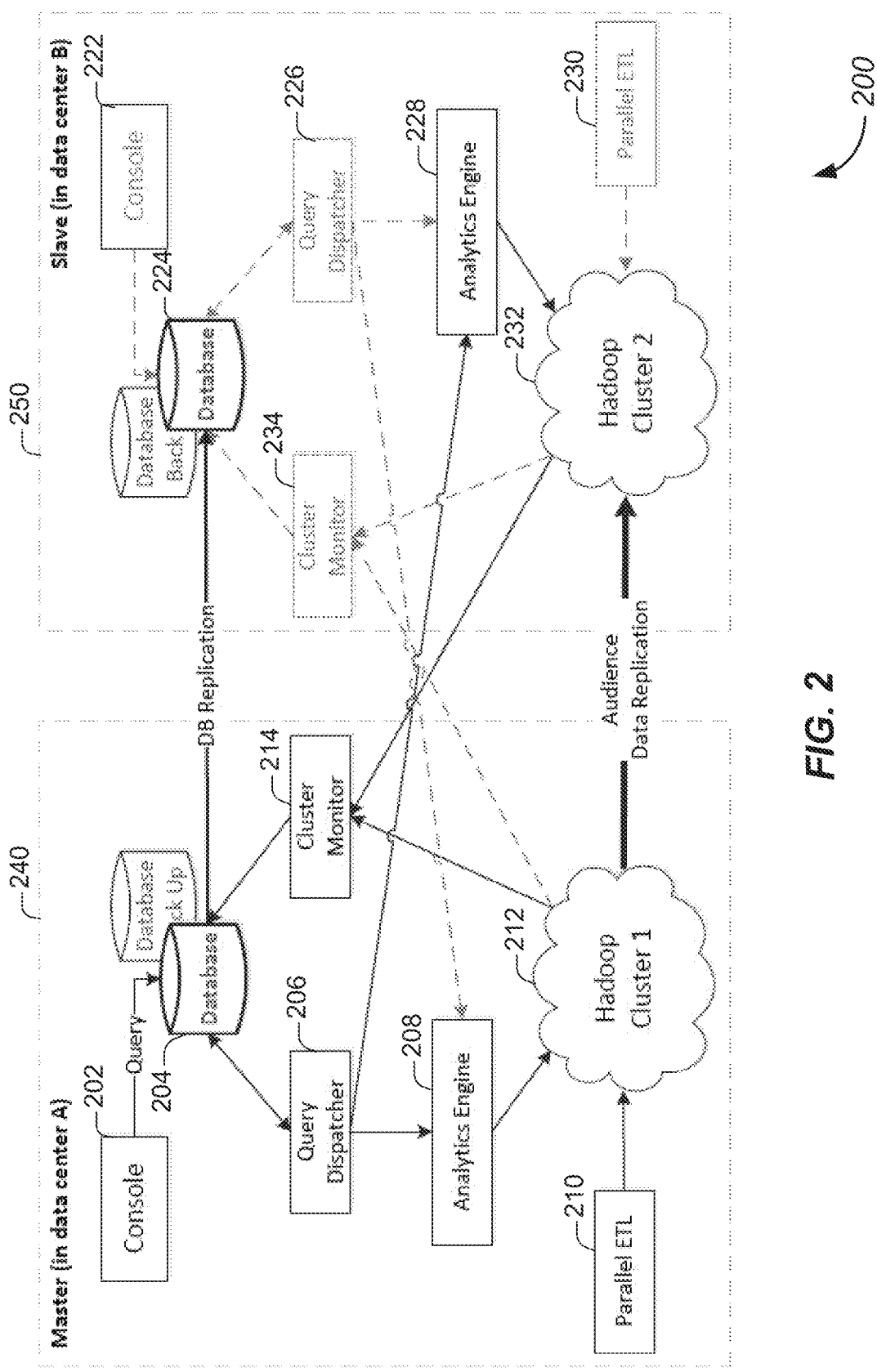
FIG. 2 illustrates a system for redundant data warehousing, configured in accordance with one or more embodiments.

FIG. 2 illustrates a system for redundant data warehousing, configured in accordance with one or more embodiments. The system shown in FIG. 2 may be used to receive large amounts of data for storage in a data storage system, such as data storage system 110 discussed above, which may be implemented at a first data center site 240. The stored data may be replicated to a second data center site 250. The data center sites may communicate via high-speed network links. The stored data may also be made available for querying.

According to various embodiments, the system shown in FIG. 2 includes redundant components that are each positioned in a respective data center site. For instance, the data centers include consoles 202 and 222, databases 204 and 224, query dispatchers 206 and 226, cluster monitors 214 and 234, analytics engines 208 and 228, data clusters 212 and 232, and parallel ETLs 210 and 230.

According to various embodiments, the data centers may be configured in a master/slave architecture. In the configuration shown in FIG. 2, the first data center site 240 is configured as the master data center while the second data center site 250 is configured as the slave data center. Although the system shown in FIG. 2 includes only two data centers in communication in a single master/slave relationship, other configurations may include various numbers of data centers arranged in various relationships.

In some implementations, the master data center in a master/slave relationship may be responsible for primary data center responsibilities such as ingesting new data, receiving queries to query stored data, dispatching queries to the data clusters, and monitoring the data clusters. The slave data center may be responsible for receiving and storing replicated data transmitted from the master data center. The slave data center may also be configured to execute queries on data stored in the slave data center. In this way, the slave data center may store an up-to-date copy of the data stored in the primary data center while providing load balancing for queries to the data.

In some implementations, one or more components in a slave data center may be placed in a disabled or deactivated state. For instance, in the system shown in FIG. 2, the console 222, the cluster monitor 234, the query dispatcher 226, and the parallel ETL 230 are placed in a disabled or deactivated state. When a component is placed in such a state, the functioning of the component may be suspended. However, the component may be ready to resume functioning upon request, for instance if one or more primary data operations are transferred from one data center to the other data center.

At each of 202 and 222, a console is shown. According to various embodiments, the console may be responsible for receiving requests to query the data stored in the data center. For instance, the console may receive requests to retrieve, alter, summarize, or otherwise analyze records stored in the data center.

At each of 204 and 224, a database is shown. According to various embodiments, the database may store any information related to the data stored in the data centers and/or the data clusters on which the data is stored. For example, the database may store queries received from the console. As another example, the database may store results of the queries received from the console and executed on the data cluster. As yet another example, the database may store data cluster status information describing an operating status of the data cluster.

In particular embodiments, the database may be associated with one or more backups. A backup database may be used to continue operations in the event of failure at the primary database. Alternately, or additionally, a backup database may be used to restore the primary database to an earlier state.

In particular embodiments, the database at the master data center may be replicated to the slave data center. The database replication may be performed via any suitable database replication technology. By replicating the database from the master data center to the slave data center, the slave data center may have a stored copy of queries, query results, and data cluster status information in the event of failure of either the master database or the entire master data center site.

At each of 206 and 226, a query dispatcher 206 is shown. According to various embodiments, the query dispatcher may be configured to retrieve queries from the database 204. The query dispatcher may also be configured to update status information for queries stored in the database. For example, the query dispatcher may update query status information to indicate that a query has been removed from a queue and is now being executed. As another example, the query dispatcher may update query status information to indicate that a query has been completed.

In some implementations, a query dispatcher may be configured to perform load balancing to execute queries on either the master or slave data cluster. For instance, the query dispatcher may retrieve cluster status information from the database 204 and determine whether the master or slave data cluster is better suited to execute a new query. When the query dispatcher selects which data cluster should execute a new query, the query dispatcher may transmit the query to the analytics engine associated with the selected data cluster. For instance, the query dispatcher 206 may transmit the query to the analytics engine 208 at the master data center or the analytics engine 228 at the slave data center.

At each of 208 and 228, an analytics engine is shown. According to various embodiments, the analytics engine may be configured to receive queries from a query dispatcher for execution on the data cluster. When a query is received, the analytics engine may execute the query on the data cluster. Executing the query may involve retrieving or altering information stored on the data cluster.

At each of 212 and 232, a data cluster is shown. The data cluster may include one or more storage servers working together to provide performance, capacity, and reliability. In many configurations, the data cluster may include many different storage servers that together provide petabytes, exabytes, or more of storage space. The data clusters shown in FIG. 2 are configured to use the open-source Apache Hadoop framework. However, any storage framework suitable for storing and accessing large amounts of data may be employed. For instance, a data cluster may be implementing using a framework such as Spark, Stratosphere, or Zillabyte.

According to various embodiments, the data cluster may store any of various types of information. For example, in one configuration the data cluster may store advertising analytics information that includes user data for advertising audience members. Such data may include user demographics information and/or user responses to digital advertisements. However, in other configurations the data cluster may store any type of high-volume data suitable for storage in a data storage cluster.

At each of 210 and 230, a parallel ETL is shown. In some implementations, the data may be ingested in to the data cluster via the parallel ETL. The parallel ETL may be responsible for extracting data from homogenous or heterogeneous data sources, transforming the data for storing it in the proper format in the data cluster, and loading it into the data cluster.

In particular embodiments, the parallel ETL may be configured to perform one or more different storage operations simultaneously. For instance, while data is being pulled in by one process, another transformation process may process the received data. Then, the data may be loaded into the data cluster as soon as transformed data is available for loading, without waiting for either or both of the earlier processes to be completed.

According to various embodiments, data may be replicated from the master data center cluster to the slave data center cluster. For example, data may be transferred from the master data center cluster to the slave data center cluster periodically, such as once every hour. As another example, data may be transferred when a calculated difference in the data stored on the two data clusters reaches a designated threshold. The data may be transfer via any suitable technique for replicating data, such as in one or more compressed data storage containers.

At each of 214 and 234, a cluster monitor is shown. According to various embodiments, the cluster monitor may be configured to receive information from one or both of the master data cluster and the slave data cluster. The information may include metadata that characterizes the contents and operations of the data cluster. For example, the cluster monitor may be configured to receive query results from the data cluster and store the query results in the database. As another example, the cluster monitor may be configured to receive status information from the data cluster that indicates the current processing load of the data cluster, the operational status of the data cluster, or other such information. For instance, the cluster may transmit to the cluster monitor an indication as to whether the data cluster is fully operational or whether one or more portions of the data cluster have failed. As another example, the cluster monitor may be configured to receive data storage information such as space usage, a number of files stored, a number of queries being executed, or other such information.

According to various embodiments, the system shown in FIG. 2 may be configured for disaster recovery and high availability. For example, the system may be capable of gracefully responding to a failure of either one or more components at the master data center and/or the entire master data center.

According to various embodiments, the components shown in FIG. 2 may be implemented in software, hardware, or a combination thereof. In some instances, a component may be implemented in specialized hardware configured to perform particular data processing tasks. For example, any or all of the console 202, the database 204, the query dispatcher 206, the analytics engine 208, the cluster monitor 214, and the parallel ETL 210 as well as their counterparts in the slave data center may be implemented as customized hardware components configured to perform specific data processing tasks.

In some implementations, any of the components shown in FIG. 2 may be backed up by duplicate components ready to take over in the event of failure of the primary component.

According to various embodiments, a data center may experience any of various types of failures, all of which the techniques and mechanisms described herein may be used to address. These failures may include, but are not limited to: network failures, power failures, cooling failures, data cluster failures, hardware failures, software failures, or catastrophic failures of an entire data center.

In some implementations, the components within a data center may communicate via high speed network links such as 200 gigabit, 1 terabit Ethernet, or even faster connections. Components across data centers may communicate via customized high speed network links or via public networks such as the Internet.

Figure 3:
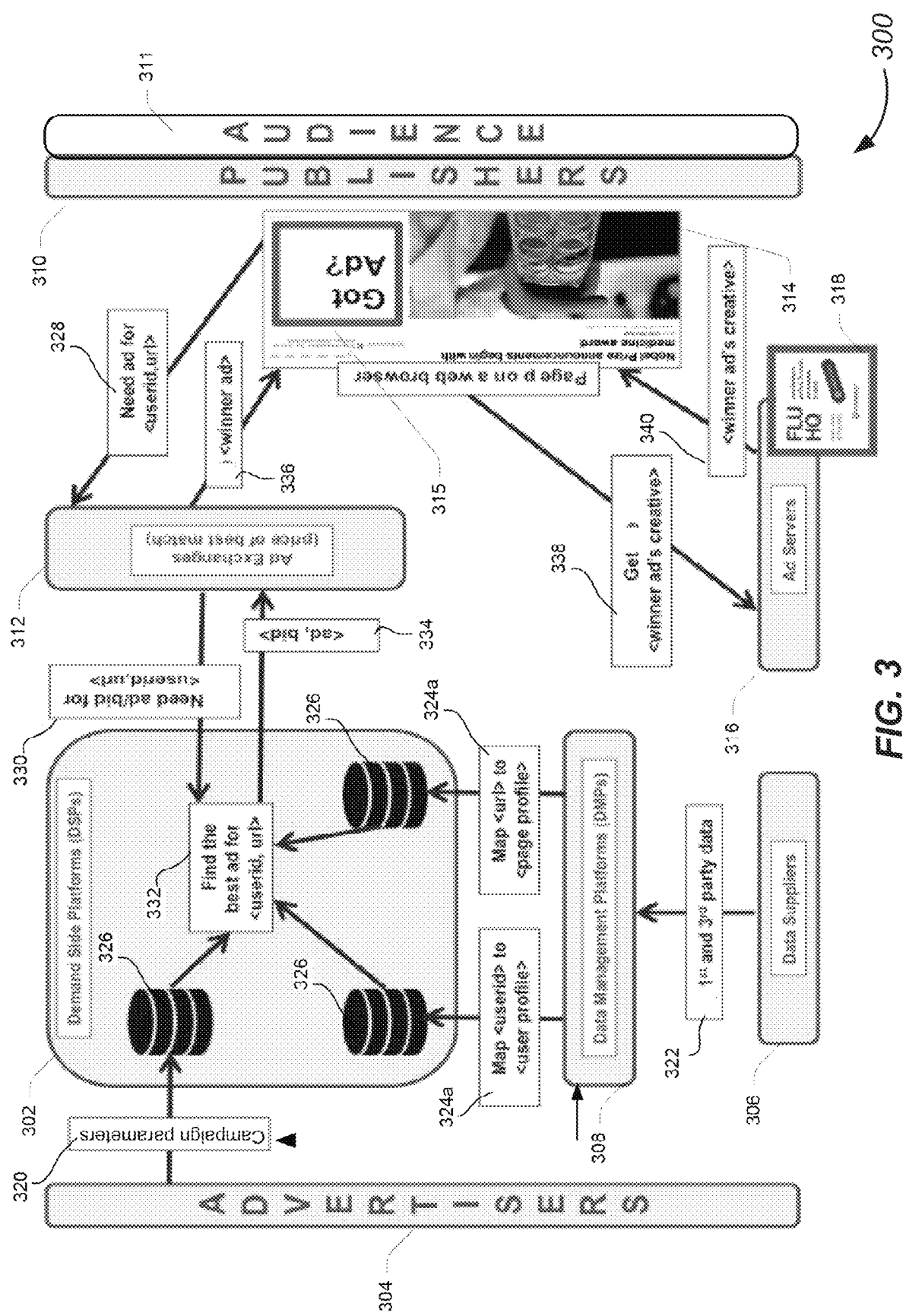
FIG. 3 illustrates a system which may include a computer network, configured in accordance with one or more embodiments.

FIG. 3 illustrates a system which may include a computer network, configured in accordance with one or more embodiments. In various embodiments, system 300 may be configured to implement various advertisement processes, and may be implemented in conjunction with system 100 described above. A real-time bidding flow will be described with respect to this system 300. At a high level, this flow can be considered in three main sections: the demand side on the left, the ad exchange 312 in the middle, and the supply side on the right. In various embodiments, a real-time bidding ecosystem may include any suitable number and type of components for providing advertisements to audience users.

Publishers 310 may provide any suitable type of displayable, executable, audible, or visual media content to users/audience 311 via a user's device or on the publisher's device or system. For example, media content may include videos, music, text, games, etc. Publishers may provide various categories of content, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computer, televisions, wearable computers, household devices, etc. Each client device may be configured with any suitable hardware and/or software (e.g., browsers and browser add-ins plug-ins, operating systems for downloading and execution of apps on mobile devices) that operates in cooperation with the publisher devices/systems for receiving and presenting media content.

Prior to providing requested media content to users 311, the Publishers 310 may also sell ad spaces with respect to such media content. Advertisers 304 at the demand side have ads to place with publisher-provided media content. In some embodiments, what is actually bought (demanded) and sold (supplied) is a fraction of the attention of online users (audience 311) as they obtain media content from or on publishers' sites. For instance, an advertiser 304 pays to have an ad placed in an ad space of a particular web page that is sold by a publisher. Although the following system 300 and flow is described with respect to ad spaces in web pages, the following processes may be implemented for other types of ad spaces in other types of media, such as mobile device apps, games, coupons, videos, etc.

The ad exchange system 312 generally runs an auction to determine a price of a match between an ad and a web page. In essence, ad exchanges are the markets providing mechanisms for facilitating bidding processes between the demand and supply sides. The ad exchanges may be implemented on any suitable number and type of computing devices.

Demand side platforms (DSPs) 302 may be generally configured to manage advertising campaigns on behalf of advertisers 304 although some advertisers may also work directly with ad exchanges. Given a user requesting a particular web page, a DSP 302 is able to find the best ad for the user (311). The best ad may be selected from the ads managed by the DSP. For each ad selected, various constraints (mostly selected by the advertisers, but some by the ad exchange, the publisher, and the DSP) are met.

Figure 4:
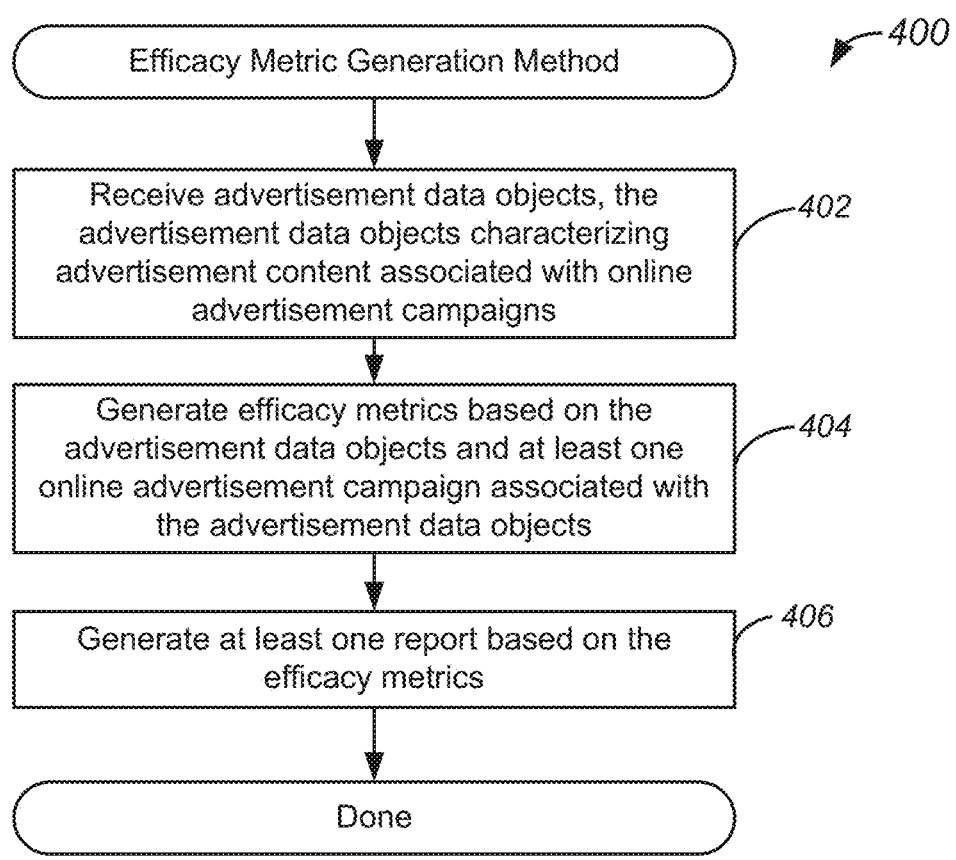
FIG. 4 illustrates a flow chart of an example of an efficacy metric generation method, implemented in accordance with some embodiments.

FIG. 4 illustrates a flow chart of an example of an efficacy metric generation method, implemented in accordance with some embodiments. As will be discussed in greater detail below, various embodiments disclosed herein may be configured to assess an efficacy of advertisement data objects that may be implemented in an online advertisement campaign. Accordingly, efficacy metrics may be generated for thousands of advertisement data objects at a time, thus enabling the rapid generation an efficacy measure across numerous advertisement data objects and numerous advertisement campaigns, and further enabling the forecasting of the overall effectiveness of the advertisement data objects before they are actually implemented in an advertisement campaign.

Method 400 may commence with operation 402 during which advertisement data objects may be received. The advertisement data objects may characterize online advertising content associated with at least one online advertisement campaign. Accordingly, the advertisement data objects may be capable of being implemented in an advertisement campaign and served to users who may then view the advertisement data objects and interact with them. For example, the advertisement data objects may be advertisements that an advertiser intends to implement as part of an online advertisement campaign. In another example, the advertisement data objects may be portions of advertisements.

Method 400 may proceed to operation 404 during which efficacy metrics may be generated. In various embodiments, the efficacy metrics may characterize an estimate of a probability of at least some of the advertisement data objects interacting with a target audience. Accordingly, the efficacy metrics may provide a predictive measure of how effective a particular advertisement may be at interacting with a user included in a target audience, and generating a conversion based on the interaction. As will be discussed in greater detail below, the generating of the efficacy metrics is based on one or more properties of the advertisement data objects which may include text, persuasive techniques, facial expressions, character identities, color schemes, and various other features. Moreover, as will also be discussed in greater detail below, the efficacy metrics may be generated across numerous advertisement data objects that may be implemented in numerous different advertisement campaigns. In this way, operation 404 may handle the generation of efficacy metrics for thousands of advertisements and provide forecasts for each of the advertisements.

Method 400 may proceed to operation 406 during which at least one report may be generated based on the efficacy metrics. In some embodiments, the at least one report characterizes the efficacy metrics associated with at least some of the advertisement data objects. Accordingly, the report may provide an entity, such as an advertiser, with a summary of the efficacy metrics that were previously generated during operation 404. Moreover, as will be discussed in greater detail below, the report may also provide recommendations detailing how the advertisement data objects may be modified to increase their efficacy scores, and may provide a user interface or console capable of making such modifications.

Figure 5:
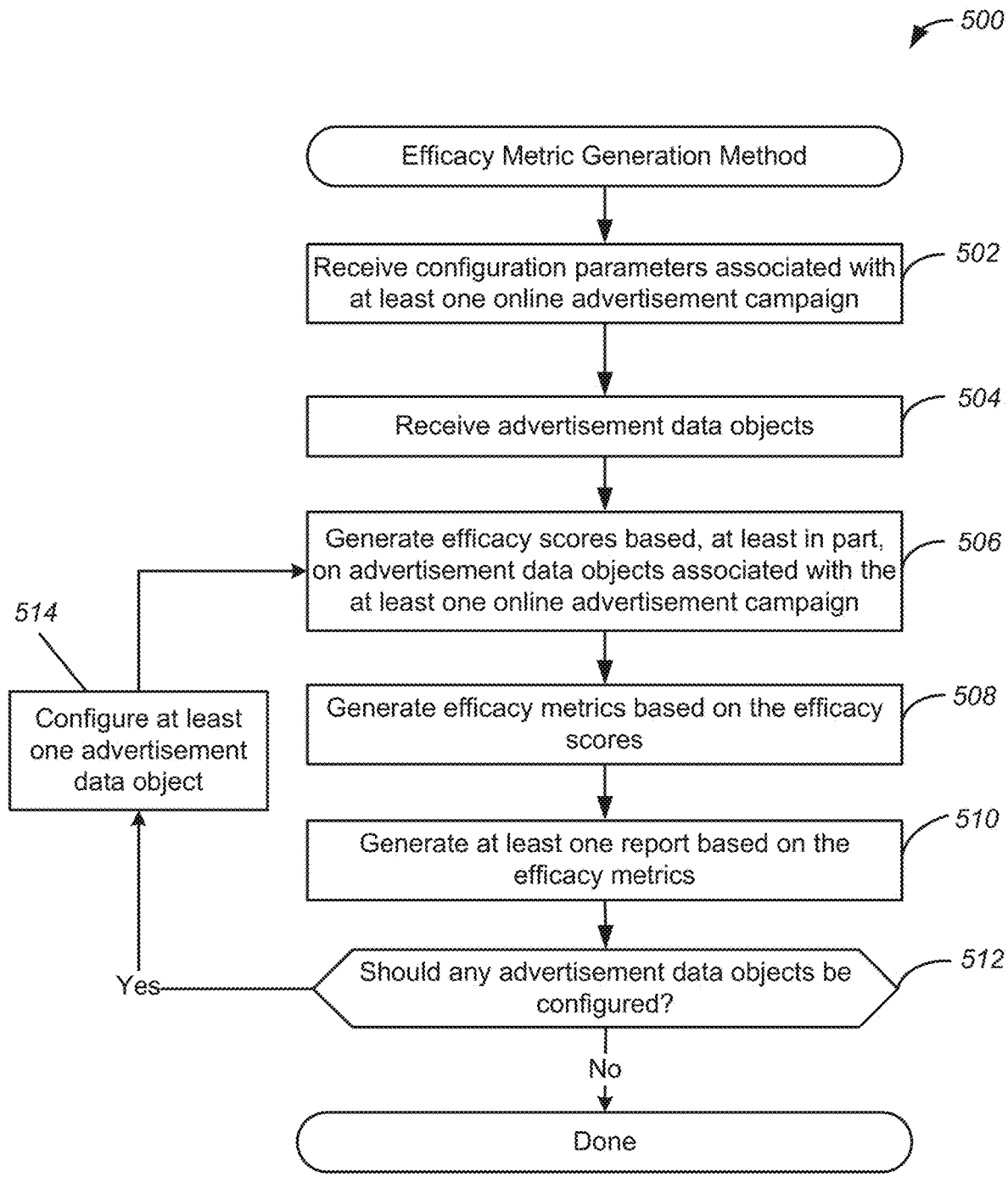
FIG. 5 illustrates a flow chart of another example of an efficacy metric generation method, implemented in accordance with some embodiments.

FIG. 5 illustrates a flow chart of an example of another efficacy metric generation method, implemented in accordance with some embodiments. As similarly discussed above, various embodiments disclosed herein may be configured to assess an efficacy of advertisement data objects that may be implemented in an online advertisement campaign. Accordingly, efficacy metrics may be generated based on characteristics of the advertisement data objects themselves, as well as characteristics of the advertisement campaigns in which they are implemented. As discussed above, the efficacy metrics may be generated for thousands of advertisement data objects at a time, thus enabling the rapid generation an efficacy measure across numerous advertisement data objects and numerous advertisement campaigns. In some embodiments, such rapid generation of efficacy metrics enables forecasting of the overall effectiveness of the advertisement data objects before they are actually implemented in an advertisement campaign.

Method 500 may commence with operation 502 during which advertisement campaigns may be configured. As similarly discussed above, the advertisement campaigns may be configured by an entity, such as an advertiser, to target a particular audience. Moreover, an advertisement campaign may be configured to include several sub-campaigns which may each include separate and distinct sets of targeting criteria. Accordingly, during operation 502, configuration parameters identifying one or more sets of targeting criteria may be received as well as other configuration information which may include additional constraints placed on the advertisement campaign, such as budgets, time limits, and pacing data which may characterize an advertisement campaign's spending over a period of time. Moreover, the configuration may also include specifying a channel or publisher through which a campaign or sub-campaign may be implemented. Furthermore, during operation 502 multiple advertisement campaigns may be configured as well as sub-campaigns associated with those advertisement campaigns.

Method 500 may proceed to operation 504 during which advertisement data objects may be received. As similarly discussed above, the advertisement data objects may be data objects that include advertisement content or information associated with the advertisement content. For example, the advertisement data object may include advertisements that an advertiser intends to implement in an advertisement campaign. Thus, an advertisement data object may include any or all of an image file, video file, textual data, layout information, an audio file, or any other suitable advertisement content. Accordingly, an advertisement data object may include data values that characterize an advertisement or a portion of an advertisement that an advertiser intends to implement in one or more of the advertisement campaigns or sub-campaigns that were configured during operation 502.

In various embodiments, the advertisement data objects may be uploaded one at a time, or provided as an addition to existing advertisement data objects already stored in a data storage system operated and maintained by an online advertisement service provider. Accordingly, an advertisement data object may be uploaded and combined with data stored in an advertiser profile or account associated with the advertiser and configured to store data associated with the advertiser's online advertisement campaigns. In some embodiments, the advertisement data objects may be uploaded as part of a batch upload. Thus, according to various embodiments, a batch of advertisement data object may be uploaded in a single operation. Accordingly, during operation 504, thousands of advertisement data objects may be uploaded by an advertiser for various campaigns and sub-campaigns. In this way, a large number of advertisement data objects may be uploaded and subsequently analyzed in a single iteration of method 500.

Method 500 may proceed to operation 506 during which efficacy scores may be generated. In some embodiments, the generation of efficacy scores may be responsive to an input received from an advertiser, such as an input requesting the generation of a report, or may be responsive to the receiving of the advertisement data objects themselves and as part of an automated process. As similarly discussed above, efficacy scores may be configured to characterize an estimate or measure of an effectiveness of an advertisement at engaging a member of a target audience, which may be a user. Thus, an efficacy score may be a data value, such as a numerical score on a designated rating scale, which provides an estimate of how effective an advertisement is at engaging an audience member, such as a user, and generating a conversion. While various embodiments described herein are described with reference to a numerical score, various other efficacy scores may be implemented as well, such as a textual description or other alphanumeric score. Furthermore, an efficacy score may have associated efficacy score data that characterizes the determinations and comparisons that underlie the efficacy score.

For example, an efficacy score may be generated by comparing targeting criteria received at operation 502 with targeting criteria inferred from the advertisement data objects themselves. Furthermore, efficacy scores may also be generated by comparing features or characteristics of the advertisement data objects with an objective measurement scale. Further still, efficacy scores may also be generated by comparing features or characteristics of the advertisement data objects with past performance data associated with one or more advertisement campaigns that include the advertisement data objects. The associated efficacy score data may include the data values that were compared to determine each of the efficacy scores. In this way, a system component, such as an efficacy score generator, may be configured to compare latent characteristics of the advertisement data objects with targeting criteria retrieved from an advertisement campaign, and may be further configured to assess an effectiveness of the advertisement data objects based on the comparison.

In various embodiments, such scores may be determined for all advertisement data objects that were uploaded during operation 504. Accordingly, during operation 506, scores may be generated for thousands, or even hundreds of thousands, of different advertisement data objects implemented across numerous online advertisement campaigns and sub-campaigns. Details of the generation of efficacy scores are discussed in greater detail below with reference to FIG. 6.

Method 500 may proceed to operation 508 during which efficacy metrics may be generated. In various embodiments, an efficacy metric may also be configured to characterize an estimate or measure of an effectiveness of an advertisement at engaging a member of a target audience. However, an efficacy metric may be generated based on a combination of one or more efficacy scores. Accordingly, an efficacy metric may be a weighted combination multiple different efficacy scores that have been generated for a single advertisement data object. For example, a single advertisement data object may be used to calculate multiple different efficacy scores based on different comparisons and determinations. Thus, each advertisement data object may have several efficacy scores. The efficacy scores may be combined to generate an efficacy metric such that the efficacy metric is a composite of the efficacy scores. In this way, an advertisement data object may have a single efficacy metric. As discussed above, the efficacy metric may combine the efficacy scores using weights which may be determined, at least in part, on features and characteristics of the advertisement campaigns associated with the advertisement data object for which the efficacy metric has been generated. For example, the weighting may be configured based on the targeting criteria of the online advertisement campaign. Details of the generation of efficacy metrics are discussed in greater detail below with reference to FIG. 6.

Method 500 may proceed to operation 510 during which at least one report may be generated. In various embodiments, the report may be configured to provide a summary of the results that were determined during operation 508. Accordingly, the report may include one or more data values that identify an advertisement data object and also identify an efficacy score that has been calculated for that advertisement data object. As will be discussed in greater detail below, the report may further include contextual data associated with the advertisement data object, such as metadata and advertisement campaign data, as well as recommendations for changes to the advertisement data object that may be made. Furthermore, the report may include such data for any or all advertisement data objects that were received during operation 504. Accordingly, the report may summarize results associated with hundreds if not thousands of advertisement data objects in a format that may be queryable and filterable. Details of the generation of reports are discussed in greater detail below with reference to FIG. 7.

Method 500 may proceed to operation 512 during which it may be determined whether or not any configuration changes or modifications should be made to the advertisement campaign data objects. As discussed in greater detail below with reference to FIG. 7, such a determination may be made based on an input received from an advertiser or one or more designated values. If it is determined that changes should be made, method 500 may proceed to operation 514 during which advertisement data objects may be configured, as discussed below in greater detail with reference to FIG. 7. If it is determined that changes should not be made, method 500 may terminate, or may return to operation 502 to initiate another iteration of method 500.

Figure 6:
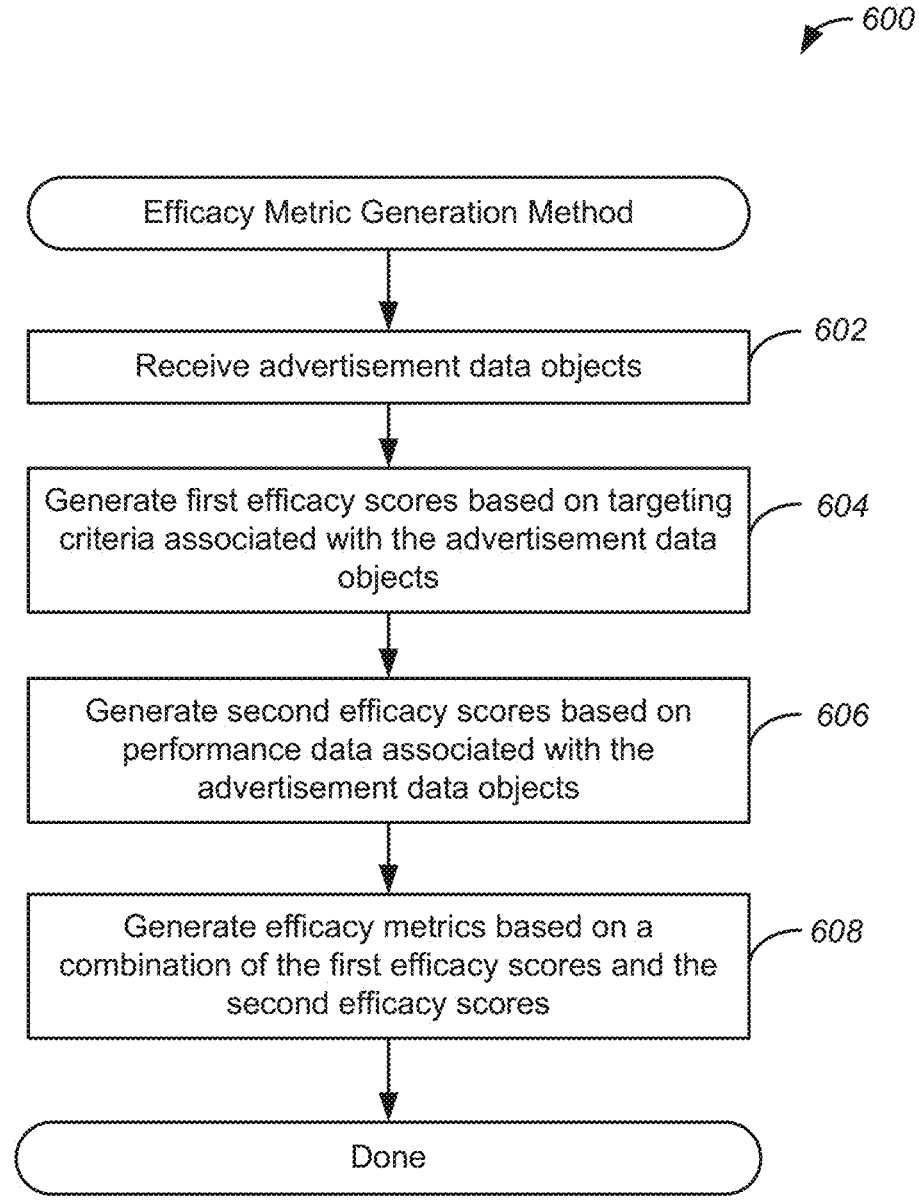
FIG. 6 illustrates a flow chart of yet another example of an efficacy metric generation method, implemented in accordance with some embodiments.

FIG. 6 illustrates a flow chart of another example of yet another efficacy metric generation method, implemented in accordance with some embodiments. As discussed above, various embodiments disclosed herein generate efficacy metrics based on characteristics of advertisement data objects themselves, as well as characteristics of the advertisement campaigns in which they are implemented. As will be discussed in greater detail below, such efficacy metrics may be generated based on features of characteristics of text, images, video, and audio included in the advertisement data objects. Moreover, the efficacy metrics may be generated based on features and characteristics, such as targeting criteria, of the advertisement campaigns that may implement the advertisement data objects.

Method 600 may commence with operation 602 during which advertisement data objects may be received. As discussed above with reference to FIG. 5, advertisement data objects may be uploaded one at a time, or provided as an addition to existing advertisement data objects already stored in a data storage system operated and maintained by an online advertisement service provider. Accordingly, an advertisement data object may be uploaded and combined with data stored in an advertiser profile or account associated with the advertiser and configured to store data associated with the advertiser's online advertisement campaigns. In some embodiments, the advertisement data objects may be uploaded as part of a batch upload. Thus, according to various embodiments, a batch of advertisement data object may be uploaded in a single operation.

Method 600 may proceed to operation 604 during which first efficacy scores may be generated based on targeting criteria associated with the advertisement data objects. In various embodiments, a system component, such as an efficacy metric generator, may be configured to identify a first set of targeting criteria based on one or more features or characteristics of the advertisement data objects. For example, for a given advertisement data object, the efficacy metric generator may be configured to analyze textual content of the advertisement data object, and further configured to utilize natural language processing to identify adjectives, nouns, and verbs included in or associated with the textual content of the advertisement data object. The efficacy metric generator may be further configured to transcribe, using a speech recognition processor, spoken words that may be included in a video or audio file that is included in the advertisement data object. The efficacy metric generator may similarly utilize natural language processing of the transcriptions to identify additional adjectives, verbs, and nouns. Further still, the efficacy metric generator may be further configured to identify, using an image recognition processor, additional textual data based on an analysis of visual data such as images and video that may be included in pictures and videos of the advertisement data object. Accordingly, the efficacy metric generator may be configured to recognize and identify particular images, colors, themes, and sequences of images, colors, and themes, as well as map what has been identified to textual data. For example, the efficacy metric generator may identify human faces in an image as well as genders associated with those faces. In one example, if most of the faces are female, textual data identifying the gender "female" may be generated. In this way, advertisement data objects may be analyzed to generate textual data which may be partitioned based on a type of source of the textual data, such as included text, audio, or video, and may form the basis of the first set of targeting criteria.

In one example, the efficacy metric generator may be configured to identify persuasive techniques implemented in the advertisement data objects based on the textual data described above, and may be further configured to generate targeting criteria based on the identified persuasive techniques. More specifically, the efficacy metric generator may be configured to analyze text included in the advertisement data objects. Such text may include sentences, phrases, and expressions that form part of the advertisement content included in the advertisement data object. The efficacy metric generator may utilize natural language processing to compare the textual data with a persuasive technique mapping which may be stored in a data object in a data storage system. The persuasive technique mapping may include a list of exemplary sentences embodying a particular persuasive technique as well as one or more identifying the persuasive technique. Accordingly, the efficacy metric generator may compare sentences included in the textual data with sentences included in the persuasive technique mapping. In one example, the efficacy metric generator may compare, utilizing natural language processing, the sentence structure of a sentence included in the textual data with sentences included in the list of exemplary sentences to determine if a match exists. If it is determined that there is a match, the sentence may be identified as implementing the same persuasive technique as that embodied by the matching exemplary sentence. Data values characterizing an identifier, such as a word, representing the identified persuasive technique may be retrieved as targeting criteria that are included in the first set of criteria.

In another example, the efficacy metric generator may be configured to identify character identities, and generate targeting criteria based on the identified character identities. As discussed above, advertisement data objects may include images and videos. In various embodiments, such images and videos may be analyzed by the efficacy metric generator to identify faces. Accordingly, for a given advertisement data object, several faces may be identified, and facial data characterizing distinguishing features of the identified faces may be stored. In various embodiments, the efficacy metric generator may be configured to compare the facial data with reference data stored in an image database that may include data characterizing popular faces which may belong to people, such as celebrities. The efficacy metric generator may be configured to compare the facial data with the reference data to see if any of the identified faces match those stored in the image database. If a match is determined, data values characterizing a character identity associated with the face may be retrieved from the image database and stored as first targeting criteria. In some embodiments, the database may also store additional data associated with the character identity, such as a target age demographic that the person is popular with, and a target gender demographic that the person is popular with. If such data is available, such data may be retrieved as well and included as first targeting criteria.

In yet another example, the efficacy metric generator may be configured to identify facial expressions, and generate targeting criteria based on the identified facial expressions. As discussed above, advertisement data objects may include images and videos, and such images and videos may be analyzed by the efficacy metric generator to identify faces. Accordingly, for a given advertisement data object, several faces may be identified, and facial data characterizing distinguishing features of the identified faces may be stored. In various embodiments, the efficacy metric generator may be configured to compare the facial data with additional reference data stored in an image database that may include data characterizing facial expressions. Accordingly, the facial data may be compared with reference or exemplary images of facial expressions to determine if the identified faces have discernable facial expressions. If a match is determined to exist, data values associated with the exemplary facial expressions may be retrieved. Such data may include one or more data values, such as a word or identifier, which represent the matching facial expression. In various embodiments, the retrieved data values may be included in the first set of targeting criteria.

In still another example, the efficacy metric generator may be configured to identify color schemes, and generate targeting criteria based on the identified color schemes. As previously discussed, the efficacy metric generator may be configured to identify colors included in an advertisement data object. In some embodiments, a list of colors used, or a list of the most predominant colors, as may be determined based on a designated threshold, may be stored as a first color scheme. In various embodiments, the efficacy metric generator may be further configured to query a data table that may include a list of key words that are mapped to second color schemes. For example, a key word may be a sports team, and the color scheme may include the two main colors of that team. The efficacy metric generator may query the list of key words based on the available textual data to identify one or more second color schemes. The efficacy metric generator may compare the first color scheme with the second color schemes to determine if there is a match. In some embodiments, a match may be represented as a flag or identifier. Accordingly, if there is a match a first value such as a "1" may be included in the first targeting criteria. If there is no match a second value such as a "0" may be included in the first targeting criteria. Returning to a previous example, if the advertisement data object is for an advertisement campaign directed at a particular sports team's fan base, the advertisement data object may include that team's colors. The colors may be identified as a first color scheme. Instance of the team name in the advertisement data object may be used to query the data table, identify key words that include the team name, and further identify second color schemes. In this example, the advertisement data object has used the team's colors, so a comparison of the first color scheme and the second color schemes would match, and a "1" may be included in the first targeting criteria.

Accordingly, the efficacy metric generator may generate the first set of targeting criteria based on the above-identified data values. Thus, the first set of targeting criteria may include data values that identify data categories determined based on text included in the advertisement data objects, persuasive techniques implemented, character identities, color schemes, as well as various other associated data. Moreover, each of the targeting criteria may be stored with a criteria identifier that identifies a type of a targeting criterion that is stored. Such an identifier may simply be an alphanumeric string that is configured to characterize or represent the source or type of data from which the targeting criteria was generated. For example, targeting criteria derived from identification of persuasive techniques may be identified by a first identifier while targeting criteria derived from character identities may be identified by a second identifier. The same may be true for all other types of data discussed above.

Once the first targeting criteria have been determined, the efficacy metric generator may compare them with second targeting criteria. In various embodiments, the second targeting criteria may be retrieved from configuration data associated with the advertisement campaigns. Accordingly, targeting criteria that was used to configure the advertisement campaigns associated with the advertisement data objects may be retrieved. Moreover, such targeting criteria may also have criteria identifiers. The efficacy metric generator may be configured to compare the identifiers, sort the targeting criteria based on their data source type, and the distributions of the sorted data may be compared to determine how similar the first set of criteria and the second set of criteria are. The result may be a statistical number or measure which represents an overall similarity between the two sets of criteria. For example, a cosine similarity measure may be determined based on the two sets of criteria. In some embodiments, the data included in the sets of criteria underlying the cosine similarity measure may be broadened or augmented based on a data table or database providing synonyms for words included in the sets of criteria. The cosine similarity measure may generate a numerical measure that may be used to determine an efficacy score. As will be discussed in greater detail below, a numerical mapping or other mapping may be used to map the numerical measures or scores, or ranges of such scores, to a rating scale. Accordingly, the first efficacy scores may be similarity scores generated based on the inferred targeting criteria derived from the advertisement data objects, and also based on the targeting criteria of their associated advertisement campaigns. Such a first efficacy score may be a numerical score on a designated rating scale, such as a scale of "1" to "10".

In some embodiments, the efficacy score may be defined by various other types of qualitative or quantitative scales. For example, the efficacy score may be a general indicator identifying a condition of "great", "very good", "good", "reasonable", "poor", "very poor", and "bad". In various embodiments, such qualitative scales may be generated by mapping the first efficacy scores and/or similarity scores, or ranges of such scores, to different indicators. In some embodiments, the scale utilized may be dynamically configurable and/or selected by a user or advertiser. For example, an advertiser may specify a particular rating scale to be used for the efficacy scores, and the advertiser may be provided with efficacy scores generated for the advertiser's advertisements using that specified scale.

Method 600 may proceed to operation 606 during which second efficacy scores may be generated based on performance data associated with the advertisement data objects. As previously discussed, various features and characteristics of the advertisement data objects may be analyzed to determined first targeting criteria. In various embodiments, the first targeting criteria may be compared with fourth targeting criteria which may be retrieved from previous performance data. More specifically, previous performance data may be data that was aggregated from previous implementations of advertisement campaigns and previous iterations of method 500. Such previous performance data may include data characterizing the advertisement data objects implemented in those previous campaigns as well as performance data associated with each advertisement data object that was previously implemented. For example, the performance data may include a conversion rate, a view rate, or any other suitable metric that characterizes user engagement. In various embodiments, the efficacy metric generator may be configured to map or convert one or more data values of the performance data to a numerical score. For example, the efficacy metric generator may convert a conversion rate, which may be a percentage or fraction, to an integer value that may be stored as a previous efficacy score. Accordingly, the efficacy metric generator may analyze the performance data to generate previous scores associated with the advertisement data objects associated with the previous performance data.

In various embodiments, the efficacy metric generator may be further configured to compare the advertisement data objects received at operation 602 with the advertisement data objects associated with the previous performance data. For example, the efficacy metric generator may be configured to compare included textual data, images, and video and determine whether matching or similar advertisement data objects exist. If a match or sufficiently similar advertisement data object is identified, its associated previous efficacy score may be identified and retrieved. The previous efficacy score may be stored as a second efficacy score and/or may be incorporated in the determination of the second efficacy score.

Method 600 may proceed to operation 608 during which efficacy metrics may be generated based on a combination of the first efficacy scores and the second efficacy scores. Accordingly, for each advertisement data object that is analyzed, an efficacy metric may be generated that is based on a combination of at least some of the efficacy scores that were generated for that advertisement data object. In one example, the efficacy metric may be an average of the different efficacy scores. As discussed above, the efficacy metric may be a weighted combination of the different efficacy scores. Accordingly, the efficacy metric may be a weighted average of the efficacy scores that preferentially weights some types of efficacy scores more than others. In various embodiments, the weights of the efficacy scores may be determined based on one or more characteristics of the advertiser and/or the advertisement campaign. For example, an advertiser might be new or not have much previous performance data. Accordingly, the second efficacy score may be weighted less.

In some embodiments, the weight may be a fraction or percentage, and may have a value designated based on the previously described weights. For example, if the second efficacy score is weighted less, it may automatically be assigned a weight of "0.2" and the first efficacy score may have a weight of "0.8". In this way, the weights may be automatically generated, and the efficacy scores may be automatically weighted and combined to generate the efficacy metrics. In some embodiments, the weights may be designated by the advertiser. Accordingly, an input may be received from the advertiser that identifies a particular weight or preference that should be attributed to at least one of the efficacy scores. It will be appreciated that the weighted averages may be normalized and consistent with a previously described numerical scale, such as a "1" to "10" scale.

As previously discussed, the previously described efficacy scores and metrics may be generated for each advertisement data object of numerous advertisement data objects. Furthermore, such scores and metrics may be generated for advertisement data objects across multiple different advertisement campaigns for different advertisers. Accordingly, thousands of advertisement data objects which may occupy upwards of several terabytes may be processed to generate estimates of the advertisement data objects' efficacies when ultimately implemented in an advertisement campaign. As will be discussed in greater detail below with reference to FIG. 7, such estimates may be generated dynamically and responsive to an input received from an advertiser. In this way, the advertiser may be provided with novel forecasting information about the implementation of the advertiser's online advertisement campaign.

Figure 7:
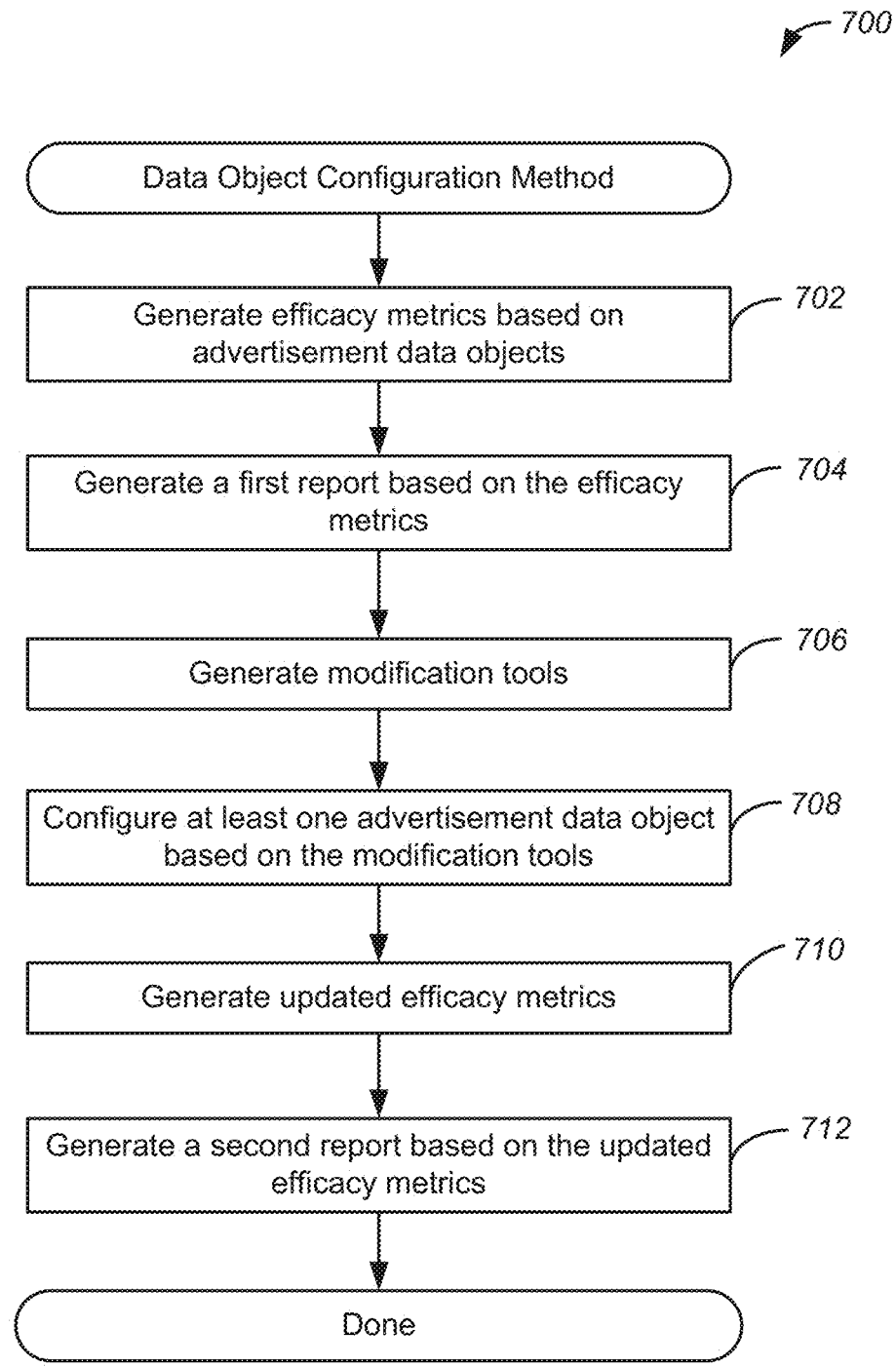
FIG. 7 illustrates a flow chart of an example of a data object configuration method, implemented in accordance with some embodiments.

FIG. 7 illustrates a flow chart of an example of a data object configuration method, implemented in accordance with some embodiments. According to various embodiments disclosed herein, various reports may be generated that summarize the above-described efficacy metrics. Moreover, the reports may provide recommendations that may describe how an advertiser may improve an advertisement data object's efficacy metric and increase user engagement. Furthermore, the advertiser may be provided with modification tools that may be utilized to make modifications based on the recommendations, and a report of the improvements that were made to the advertisement data objects efficacy metrics.

Method 700 may commence with operation 702 during which efficacy metrics may be generated. As discussed above with reference to FIG. 5 and FIG. 6, the efficacy metrics may be generated based on received advertisement data objects, and may characterize an estimate or measure of an effectiveness of an advertisement at engaging a member of a target audience. Moreover, the efficacy metrics may be stored as data objects in a data storage system operated and maintained by an online advertisement service provider. In some embodiments, the efficacy metrics may be stored in an advertiser profile that is specific to a particular advertiser.

Method 700 may proceed to operation 704 during which a first report may be generated based on the efficacy metrics. As similarly discussed above, the report may provide a summary of the efficacy metrics in a data object that is capable of being displayed on a display device of a computing system. In some embodiments, the report may be generated automatically and responsive to the upload of the advertisement data objects and generation of the efficacy metrics. In some embodiments, the report may be generated responsive to an input provided by an advertiser. For example, an advertiser may be presented with a user interface or console through which they may upload the advertisement data objects. Upon upload, the advertiser may also be presented with a first user interface component or element, such as a button, which may be configured to receive an input, such as a mouse click, from the advertiser. In response to receiving the input, a system component, such as a report generator, may generate a report for at least some of the advertisement data objects. In some embodiments, the report may be for a single advertisement data object that has been selected by an advertiser. In various embodiments, the report may be generated for thousands of advertisement data objects and may provide a unified view of efficacy metrics across all advertisement data objects that were analyzed. As will be discussed in greater detail below, the report may be presented to an advertiser via a user interface or console. In some embodiments, the report may be automatically generated in response to the generation of the efficacy metrics and may be transmitted electronically to the advertiser. For example, the report may be included in an electronic message that is automatically generated and sent to the advertiser.

As discussed above, the report may include a summary of efficacy metrics associated with advertisement data objects. For example, the report may include a first data field that includes identifying information associated with one or more advertisement data objects. Thus, for each advertisement data object that was analyzed, the first data object may include an advertisement data object name or identifier as well as relevant metadata, such as a time stamp identifying a time and data of creation and upload. The report may also include a second data field that includes an efficacy metric that was generated for that advertisement object. As discussed above, such efficacy metrics may be numbers on a numerical scale, such as a scale of "1" to "10". In some embodiments, the report may also include various additional data associated with the efficacy metrics and the advertisement data objects. The additional data may characterize one or more recommendations associated with the advertisement data objects. In some embodiments, the recommendations may characterize suggested modifications that may be made to one or more advertisement data objects to improve its efficacy metric. For example, a recommendation may include additional words that may be included in or used to replace words already included text of an advertisement data object. The recommendations may also include additional persuasive techniques that may be used as well as additional color schemes that may be used. The recommendations may further include information identifying components or elements of the advertisement data object that are negatively impacting the efficacy metric, such as a particular facial expression or the presence of a particular character identity. In some embodiments, the recommendations may further identify textual content that is not relevant to the target audience and is not positively impacting the efficacy metric. Moreover, the recommendations may further indicate that a particular color scheme is too bright or too colorful for a target audience. Further still, the recommendations may also indicate that facial expressions are too emphatic or aggressive for a target audience.

In some embodiments, the report may also include user interface components configured to enable modification of the advertisement data objects. For example, for a particular advertisement data object, the report may include a second user interface component that is configured to link to or provide access to another console which may be configured to edit, modify, and revise advertisement data objects. Accordingly, in response to an advertiser providing an input, such as a mouse click, to the second user interface component, the advertiser may be presented with another console through which the advertiser may be presented with various modification tools and may modify one or more advertisement data objects.

Accordingly, method 700 may proceed to operation 706 during which modification tools may be generated. The modification tools included in the user interface or console presented to the advertiser may be dynamically generated based on the previously described recommendations or based on a selection made by the advertiser. For example, if the recommendations include additional words and alternate persuasive techniques as well as different color schemes, the console may be configured to include a text editing module and a color editing module. In this way, the console may be configured to a particular advertisement data object or a batch of advertisement data objects that is being modified.

Method 700 may proceed to operation 708 during which advertisement data objects may be configured using the modification tools. Accordingly, an entity, such as an advertiser may utilize the previously discussed modification tools to implement one or more changes or modifications on various advertisement data objects. In this way, the advertiser may change or modify advertisement data objects based on the recommendations that were provided to potentially increase the efficacy metric of the advertisement data object.

Method 700 may proceed to operation 710 during which updated efficacy metrics may be generated. Accordingly, a system component, such as an efficacy metric generator, may be configured to generate new and updated efficacy metrics based on the updated or modified advertisement data objects. Such updated efficacy metrics may be stored in the data storage system operated and maintained by the online advertisement service provider.

Method 700 may proceed to operation 712 during which a second report may be generated based on the updated efficacy metrics. As similarly discussed above, the second report may include data values identifying the advertisement data objects for which the report was generated. In some embodiments, the second report may display the efficacy scores that were initially generated for the advertisement data objects as well as their associated updated efficacy scores. Thus, the report may provide a unified view of the advertisement data objects and their efficacy scores as well as any change in their efficacy scores that occurred as a result of the modification. In this way, the second report may provide a detailed account of any changes and improvements in the efficacy scores associated with the advertisement data objects.

Figure 8:
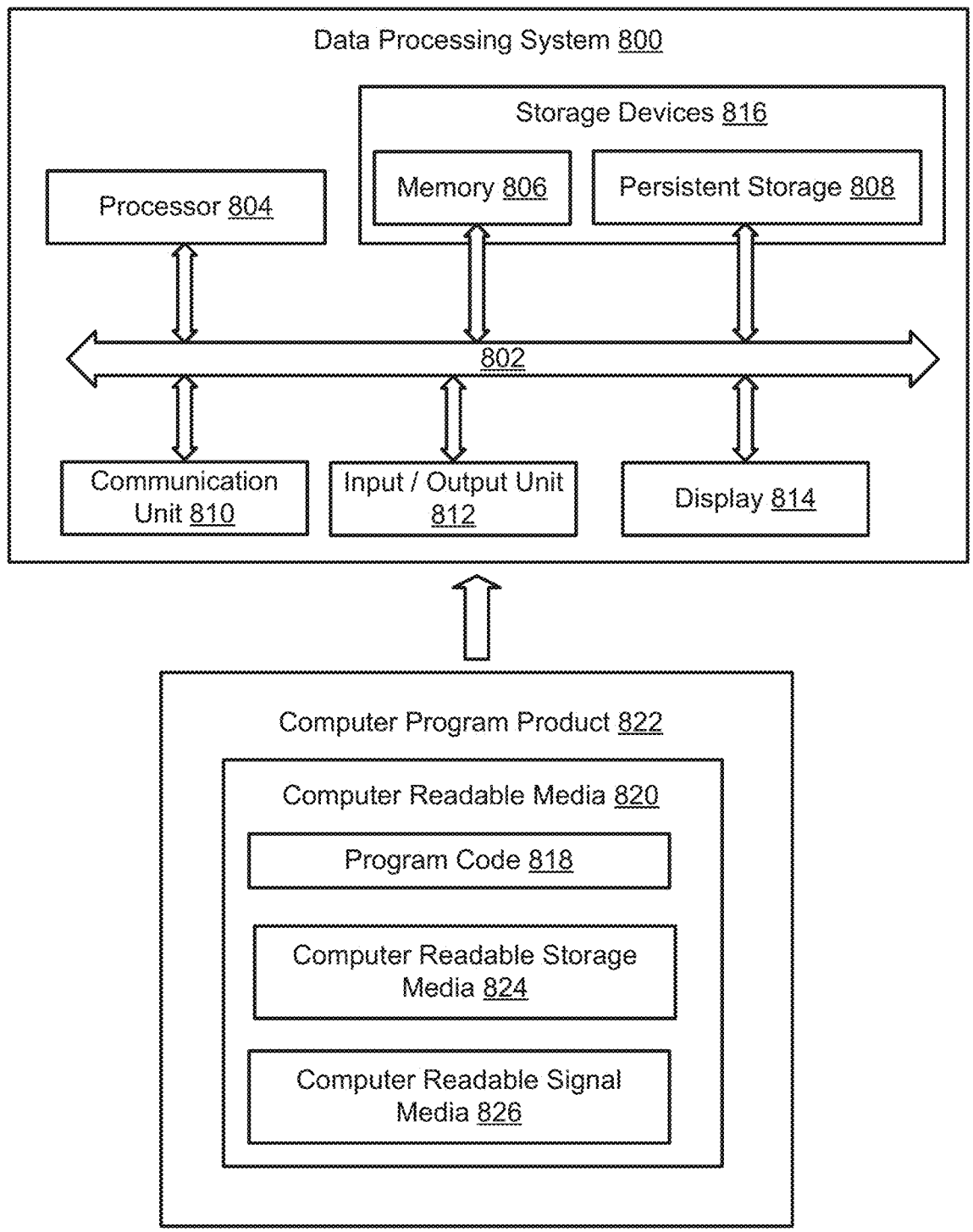
FIG. 8 illustrates a data processing system configured in accordance with some embodiments.

FIG. 8 illustrates a data processing system configured in accordance with some embodiments. Data processing system 800, also referred to herein as a computer system, may be used to implement one or more computers or processing devices used in a controller, server, or other components of systems described above. In some embodiments, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, as may be included in a multi-processor core. In various embodiments, processor unit 804 is specifically configured to process large amounts of data that may be involved when processing advertisement data objects associated with one or more advertisement campaigns, as discussed above. Thus, processor unit 804 may be an application specific processor that may be implemented as one or more application specific integrated circuits (ASICs) within a processing system. Such specific configuration of processor unit 804 may provide increased efficiency when processing the large amounts of data involved with the previously described systems, devices, and methods. Moreover, in some embodiments, processor unit 804 may be include one or more reprogrammable logic devices, such as field-programmable gate arrays (FPGAs), that may be programmed or specifically configured to optimally perform the previously described processing operations in the context of large and complex data sets sometimes referred to as "big data."

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A system comprising:
   a data object aggregator comprising one or more processors configured to receive a plurality of historical advertisement data objects characterizing online advertising content associated with a plurality of different online advertisement campaigns that were implemented for a plurality of different advertisers, the historical advertisement data objects including one or more of the following: a plurality of identified faces, a plurality of facial expressions, a plurality of color schemes, a plurality of predominant colors, and/or a plurality of text, wherein the plurality of historical advertisement data objects is received during a batch upload process;
   an efficacy metric generator comprising one or more processors configured to generate a plurality of efficacy metrics characterizing an estimate of a probability of a plurality of current advertisement objects, which are associated with a current online advertisement campaign, interacting with a target audience, the generating being performed prior to implementing the current campaign and the plurality of efficacy metrics being based on a first set of targeting criteria, which specifies values for the plurality of historical advertisement data objects, matching a second set of targeting criteria, which specifies values for the plurality of historical advertisement data objects;
   a report generator comprising one or more processors configured to generate at least one report based on the plurality of efficacy metrics, the report comprising a plurality of user interface components configured to specify one or more recommendations for one of the advertisers that describe how the plurality of current advertisement objects can be modified to improve one or more of the efficacy metrics and to increase interactions with the target audience for the modified current advertisement objects and enable modifications of the plurality of current advertisement data objects; and
   a database system configured to store the plurality of efficacy metrics.

2. The system of claim 1, wherein the plurality of efficacy metrics includes one or more statistical numbers or measures that represent an overall similarity between the first and second sets of targeting criteria and probabilities of the plurality of current advertisement objects and the historical advertisement objects, from the matching first and second sets of targeting criteria, interacting with the target audience.

3. The system of claim 1, wherein the plurality of efficacy metrics is generated based on past performance data associated with the plurality of different online advertisement campaigns.

4. The system of claim 3, wherein the generating of the plurality of efficacy metrics is generated based on a weighted combination of first efficacy scores associated with the matching of the first set of targeting criteria and the second set of targeting criteria, and second efficacy scores associated with the past performance data.

5. The system of claim 1, wherein the at least one report includes a summary of at least some of the plurality of efficacy metrics, and wherein the at least one report further includes the one or more recommendations associated with the plurality of current advertisement data objects, wherein the system is further configured for receiving and implementing at least one modification of one or more current advertisement objects based on the one or more recommendations.

6. The system of claim 5, wherein the plurality of recommendations characterizes modifications associated with the plurality of current advertisement data objects, the modifications being capable of increasing at least some of the plurality of efficacy metrics.

7. The system of claim 5, wherein the efficacy metric generator is configured to generate a plurality of updated efficacy metrics in response to receiving at least one modification from an advertiser.

8. The system of claim 7, wherein the at least one modification being based, at least in part on the plurality of recommendations.

9. The system of claim 1, wherein the at least one report is generated responsive to a request received from an advertiser.

10. The system of claim 1, wherein the plurality of historical advertisement data objects is received during a single upload operation comprising the batch upload process.

11. A method comprising:
receiving a plurality of historical advertisement data objects characterizing online advertising content associated with a plurality of different online advertisement campaigns that were implemented for a plurality of different advertisers, the historical advertisement data objects including one or more of the following: a plurality of identified faces, a plurality of facial expressions, a plurality of color schemes, a plurality of predominant colors, and/or a plurality of text, wherein the plurality of historical advertisement data objects is received during a batch upload process;
generating a plurality of efficacy metrics characterizing an estimate of a probability of a plurality of current advertisement objects, which are associated with a current online advertisement campaign, interacting with a target audience, the generating being performed prior to implementing the current campaign and the plurality of efficacy metrics being based on a first set of targeting criteria, which specifies values for the plurality of historical advertisement data objects, matching a second set of targeting criteria, which specifies values for the plurality of historical advertisement data objects; and
generating at least one report based on the plurality of efficacy metrics, the report comprising a plurality of user interface components configured to specify one or more recommendations for one of the advertisers that describe how the plurality of current advertisement objects can be modified to improve one or more of the efficacy metrics and to increase interactions with the target audience for the modified current advertisement objects and enable modifications of the plurality of current advertisement data objects.

12. The method of claim 11, wherein the plurality of efficacy metrics includes one or more statistical numbers or measures that represent an overall similarity between the first and second sets of targeting criteria and the probability of the plurality of current advertisement objects and the historical advertisement objects, from the matching first and second sets of targeting criteria, interacting with the target audience.

13. The method of claim 11, wherein the plurality of efficacy metrics is generated based on past performance data associated with the plurality of different online advertisement campaigns.

14. The method of claim 11, wherein the generating of the plurality of efficacy metrics is generated based on a weighted combination of first efficacy scores associated with a comparison of the first set of targeting criteria and the second set of targeting criteria, and second efficacy scores associated with the past performance data.

15. The method of claim 11, wherein the at least one report includes a summary of at least some of the plurality of efficacy metrics, and wherein the at least one report further includes the one or more recommendations associated with the plurality of current advertisement data objects, the method further comprising receiving and implementing at least one modification of one or more current advertisement objects based on the one or more recommendations.

16. One or more non-transitory computer readable media having instructions stored thereon for performing a method, the method comprising:
receiving a plurality of historical advertisement data objects characterizing online advertising content associated with a plurality of different online advertisement campaigns that were implemented for a plurality of different advertisers, the historical advertisement data objects including one or more of the following: a plurality of identified faces, a plurality of facial expressions, a plurality of color schemes, a plurality of predominant colors, and/or a plurality of text, wherein the plurality of historical advertisement data objects is received during a batch upload process;
generating a plurality of efficacy metrics characterizing an estimate of a probability of a plurality of current advertisement objects, which are associated with a current online advertisement campaign, interacting with a target audience, the generating being performed prior to implementing the current campaign and the plurality of efficacy metrics being based on a first set of targeting criteria, which specifies values for the plurality of historical advertisement data objects, matching a second set of targeting criteria, which specifies values for the plurality of historical advertisement data objects; and
generating at least one report based on the plurality of efficacy metrics, the at least one report based on the plurality of efficacy metrics, the report comprising a plurality of user interface components configured to specify one or more recommendations for one of the advertisers that describe how the plurality of current advertisement objects can be modified to improve one or more of the efficacy metrics and to increase interactions with the target audience for the modified current advertisement objects and enable modifications of the plurality of current advertisement data objects.

17. The one or more non-transitory computer readable media of claim 16, wherein the plurality of efficacy metrics comprises one or more statistical numbers or measures that represent an overall similarity between the first and second sets of targeting criteria and probabilities of the plurality of current advertisement objects and the historical advertisement objects, from the matching first and second sets of targeting criteria, interacting with the target audience.

18. The one or more non-transitory computer readable media of claim 16, wherein the generating of-the plurality of efficacy metrics comprises:
comparing the current advertisement data objects with past performance data associated with the plurality of different online advertisement campaigns.

19. The one or more non-transitory computer readable media of claim 18, wherein the generating of the plurality of efficacy metrics comprises:
combining first efficacy scores associated with the matching of the first set of targeting criteria and the second set of targeting criteria, and second efficacy scores associated with the past performance data.

* * * * *